United States Patent
Abadi et al.

(10) Patent No.: US 9,477,448 B2
(45) Date of Patent: Oct. 25, 2016

(54) SCREEN-ORIENTED COMPUTING PROGRAM REFACTORING

(71) Applicant: International Business Machines Corporation, Armonk, NY (US)

(72) Inventors: Aharon Abadi, Eilat (IL); Moria Abadi, Petah-Tikva (IL); Idan Ben-Harrush, Givat Elah (IL)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 14/064,143

(22) Filed: Oct. 27, 2013

(65) Prior Publication Data

US 2015/0121336 A1 Apr. 30, 2015

(51) Int. Cl.
*G06F 9/44* (2006.01)

(52) U.S. Cl.
CPC .. *G06F 8/38* (2013.01); *G06F 8/72* (2013.01)

(58) Field of Classification Search
CPC ...... G06F 11/3608; G06F 8/75; G06F 8/433; G06F 8/443; G06F 3/04886; G06F 1/1692; G06F 8/33; G06F 8/38
See application file for complete search history.

(56) References Cited

U.S. PATENT DOCUMENTS

| | | | |
|---|---|---|---|
| 2002/0104071 A1* | 8/2002 | Charisius et al. | 717/109 |
| 2014/0053085 A1* | 2/2014 | Stephure et al. | 715/753 |
| 2014/0165035 A1* | 6/2014 | Campbell et al. | 717/121 |

OTHER PUBLICATIONS

Androutsopoulos et al, "A Theoretical and Empirical Stude of EFSM dependency" Crest, London, Sep. 2009, pp. 1-10 <AndrSpl_EFSM.pdf>.*
Abadi et al, "Improving Slice Accuracy by Compression of Data and Control Flow Paths" Copyright 2009, pp. 223-232 <Abadi_slice09.pdf>.*
Verbaere & Hall, "Program Slicing for Refactoring" 2003 67 pgs.<Verbaere_03.pdf>.*
Abadi et al, "Codeless Screen-Oriented Programming for Enterprise Mobile Applications" Copyright 2010, p. 1-6 <Nitrogen_10.pdf>.*
Abadi et al, "Codeless Screen-Oriented Programming for Enterprise Mobile Applications", SPLASH'13, copyright 2010, submitted Oct. 5, 2013, p. 1-6<Nitrogen_10.pdf>.*
Abadi et al, "codeless screen-oriented Programming for Enterprise Mobile Applications", PROMOTO—bibliographic data; 2 pages <Abadi_Biblio.pdf>.*
Xiao et al., "Slicing*—Tree Based Web Page Transformation for Small Displays", CIKM '05 Proceedings of the 14th ACM international conference on Information and knowledge management, pp. 303-304.

(Continued)

*Primary Examiner* — Tuan Vu

(57) ABSTRACT

Techniques for refactoring a screen-oriented computing program are described herein. The techniques include a method that identifies screens of the computing program, and determines a starting point of the computing program based on the identified screens. The techniques include refactoring the computing program based on the starting point and the identified screens.

18 Claims, 7 Drawing Sheets

(56) References Cited

OTHER PUBLICATIONS

Aharon Abadi, Yael Dubinsky, Andrei Kirshin, Yossi Mesika, Idan Ben-Harrush; "Codeless Screen-Oriented Programming for Enterprise Mobile Applications"; Cornell University, arXiv:1310.1506 [cs.SE]; Submitted for Review on Oct. 5, 2013, pp. 6; http://arxiv.org/abs/1310.1506.

Aharon Abadi, Yael Dubinsky, Andrei Kirshin, Yossi Mesika, Idan Ben-Harrush; "Codeless Screen-Oriented Programming for Enterprise Mobile Applications"; Journal arXiv preprint arXiv:1310.1506, Submitted for Review on Oct. 5, 2013, https://scholar.google.com/citations?view_op=view_citation&hl=en&user=OP_SkHMAAAAJ&citation_for_view=OP_SkHMAAAAJ:_FxGoFyzp5QC.

* cited by examiner

100

300

500

600

SCREEN-ORIENTED COMPUTING PROGRAM REFACTORING

BACKGROUND

The present invention relates to analysis of computer programs. Program analysis plays an important role in a variety of software engineering processes, such as program refactoring. Program refactoring may restructuring an existing body of code without changing the external behavior. Program refactoring may reduce errors and the time it takes to develop a given computing program. Advantages include improved code readability an reduced complexity to improve the code.

SUMMARY

In one embodiment, a system and a method for refactoring a computing program based on identified screens of the computing program is described herein. The method may identify screens of a computing program, and determine a starting point of the computing program based on the identified screens. The method may include refactoring the computing program based on the starting point and the identified screens. The refactoring is therefore based on the screens of the computing program and the identified starting points.

DETAILED DESCRIPTION

The subject matter disclosed herein relates to techniques for refactoring a computing program based on identified screens of the computing program. Some integrated development environments refactor based on standard programming languages. However, the techniques discussed herein, refactor based on identified screens of a computing program. Screen-oriented refactoring may be based on data flow between screens of a computing program such that the data flow of the computing program to and from a given point remain intact.

Figure 1:
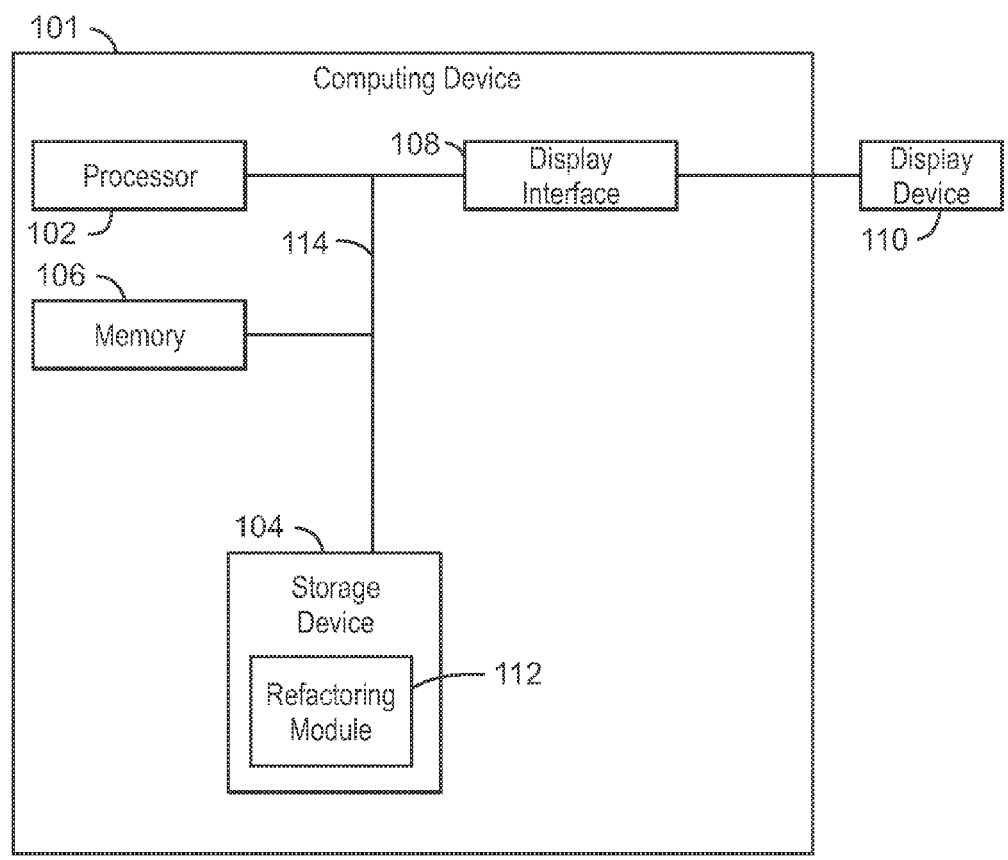
FIG. 1 is a block diagram of a computing system configured to refactor a computing program.

FIG. 1 is a block diagram of a computing system configured to refactor a computing program. The computing system 100 may include a computing device 101 having a processor 102, a storage device 104 comprising a non-transitory computer-readable medium, a memory device 106, a display interface 108 communicatively coupled to a display device 110. The storage device 104 may include a refactoring module 112 configured to refactor a screen-oriented computing program. In embodiments, the display interface 108 may enable a user of the computing system 101 to view the refactoring generated by the refactoring module 112 via the display device 110. The display device 110 may be an external component to the computing device 101, an integrated component of the computing device 101, or any combination thereof.

The refactoring module 112 may be logic, at least partially comprising hardware logic. In embodiments, the refactoring module 112 may be implemented as instructions executable by a processing device, such as the processor 102. The instructions may direct the processor to identify screens of a computing program. The screens are graphical user interface implementations of the computing program. In some embodiments, the screens are configured to be displayed on a mobile device, such as a smart phone, tablet computer, personal computing device and the like. In some embodiments, the computing program may be an enterprise application having a screen-oriented design. The screen-oriented of mobile, or enterprise, computing programs enables such programs to be refactored based on the screens identified. The refactoring module 112 determines a starting point of the computing program based on the identified screens. The instructions of the refactoring module 112 direct the processor 102 to refactor the computing program based on the starting point and the identified screens such that data flow and control flow between the identified screens remains the same as the data flow and control flow of the computing program without refactoring.

In some embodiments, an extended finite state machine with data flow edges and control flow edges may be used in refactoring of the computer program. The representation of the computer program as a finite state machine enables efficient analysis wherein the screens of the computer program are represented as nodes and the dataflow between screens is represented as edges of the graph as discussed in more detail below. However, other representations may be used in refactoring, and a finite state machine representation is provided as one embodiment.

The processor 102 may be a main processor that is adapted to execute the stored instructions. The processor 102 may be a single core processor, a multi-core processor, a computing cluster, or any number of other configurations. The memory unit 106 can include random access memory, read only memory, flash memory, or any other suitable memory systems. The main processor 102 may be connected through a system bus 114 to components including the memory 106, the storage device 104, and the display interface 108.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
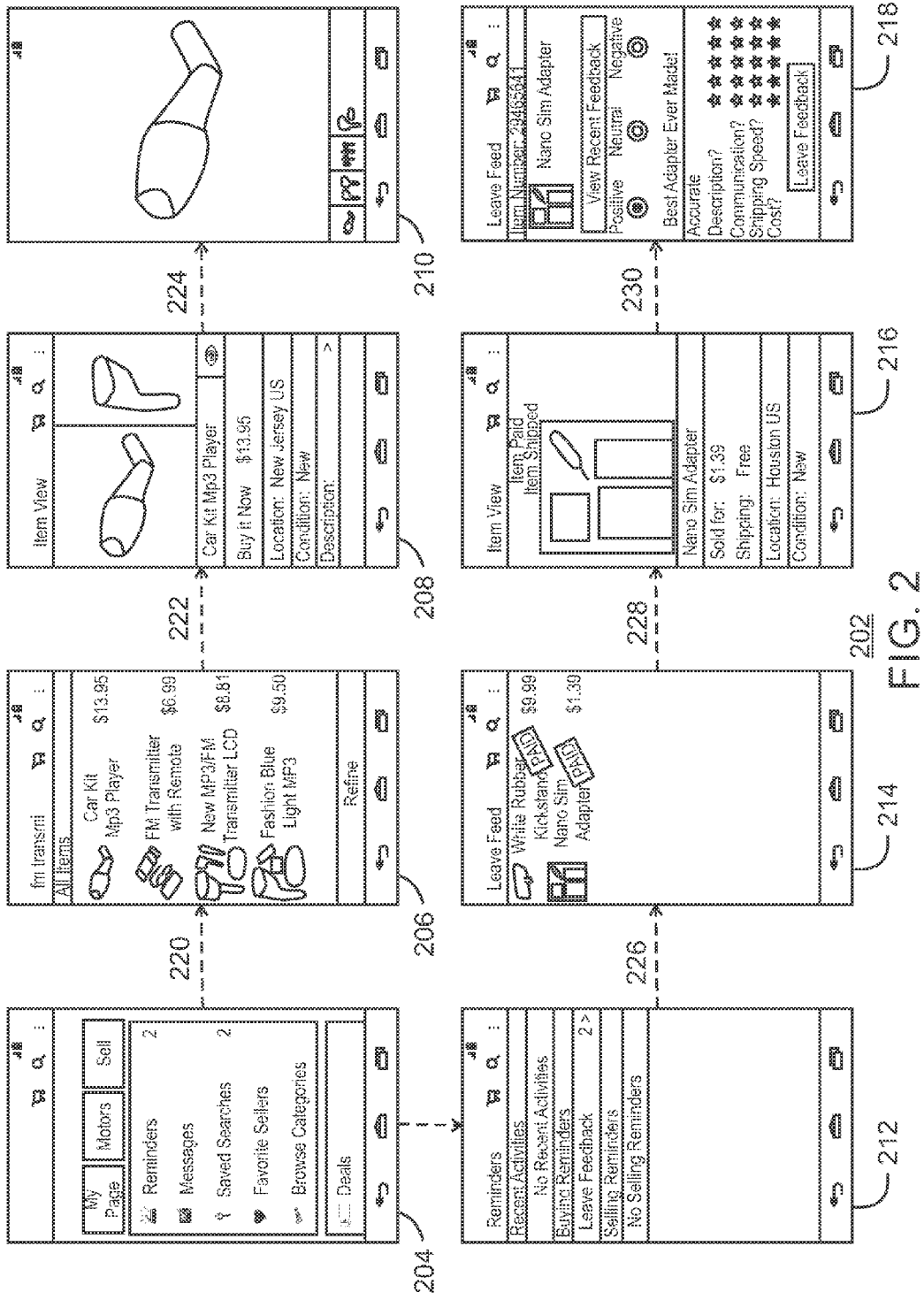
FIG. 2 is an example illustration of screens of a mobile application.

FIG. 2 is an example illustration of screens of a mobile application. The computer program 202 may include screens 204, 206, 208, 212, 214, 216, 218, wherein control flow of transitions from one screen to another screen are indicated by the dashed arrows 220, 222, 224, 226, 228, 230. The arrows 220, 222, 224, 226, 228, 230 are control flow arrows discussed in more detail below in reference to FIG. 3. As computer programs implemented as mobile applications are increasingly screen-oriented, representations of such computer programs may include the screens as nodes of a finite state machine graph, while dataflow between the screens may be represented as edges of the finite state machine graph.

As illustrated in FIG. 2, the computer program 202 may be a mobile application of an auction website having two general control paths. In a first control path, at screen 204, a search query may be entered and the results of the query may be presented at screen 206. If a user selects an item in the resulting query of screen 206, a selected item is presented at screen 208. If the user selects an image associated with the selected item, a larger image may be presented at screen 210. In a second control path, screen 212 presents reminders when the user selects reminders on screen 204. If the user selects to leave feedback on screen 212, purchased items for which feedback has not yet been submitted is presented on screen 214. When one of the purchases on screen 214 is selected, the chosen item may be displayed at screen 216. If the user selects to leave feedback from the chosen item at screen 216, screen 218 enables the user to leave feedback for the chosen item.

Figure 3:
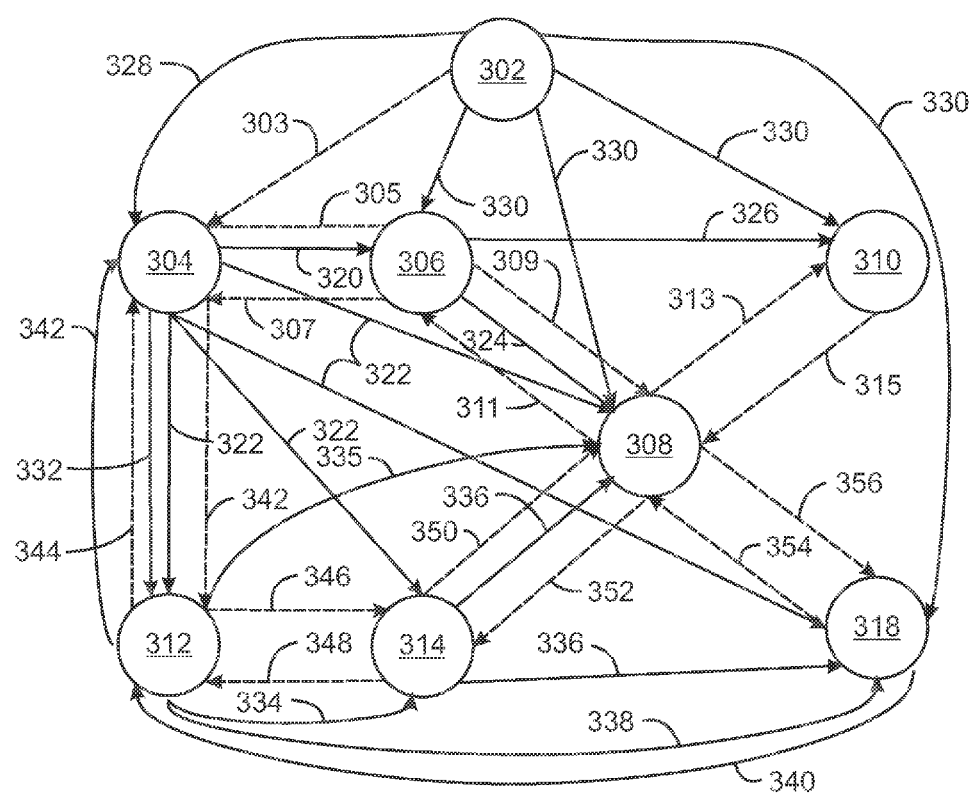
FIG. 3 is a graph formed based on the screens, dataflow, and control flow of an application.

FIG. 3 is a graph formed based on the screens, dataflow, and control flow of an application. The graph 300 includes an entry node 302 and screens of a computer program are represented as nodes 304, 306, 308, 310, 312, 314, 318 in a finite state machine graph. The entry node 302 is a virtual initial state of the finite state machine, and does not represent a screen. The dashed arrows represent control flow, and the solid arrows represent data flow. For example, data flow indicating a customer identification (ID) may be entered at a screen associated with the node 304, and may flow to nodes that may require the cID, such as nodes 308, 312, 314, and 318, as indicated by the arrows 322. The graph illustrated in FIG. 3 is based on the screens discussed above in reference to FIG. 2. Screen 204 of FIG. 2 is represented as node 304 in FIG. 3. Screen 206 of FIG. 2 is represented as node 306 in FIG. 3. Screen 210 of FIG. 2 is represented as node 310 in FIG. 3. Screen 212 of FIG. 2 is represented as node 312 in FIG. 3, and screen 214 of FIG. 2 is represented as node 314 in FIG. 3. Screen 218 of FIG. 2 is represented as node 318 in FIG. 3. In embodiments, the screens 208 and 216 of FIG. 2 may be implemented using the same or similar code, and are combined as node 308 in FIG. 3. Although the graph 300 illustrated in FIG. 3 is implemented to represent the screens and data flow between the screens discussed above in reference to FIG. 2, other computer programs may be implemented by representing the screens as nodes and data flow as edges of a finite state machine graph is a similar manner as described herein.

As illustrated in FIG. 3, each of the screens is represented as a node indicating a state in the graph 300. Control flow between screens indicated by the dashed arrows 220, 222, 224, 226, 228, 230 in FIG. 3, are indicated as dashed arrows in in the finite state machine graph 300 of FIG. 3. Data flow is defined by the state, such as the options of a given screen, and data flow associated with a given option are represented as solid edges indicated by solid arrows in the finite state machine graph 300 of FIG. 3. For example, if a variable is selected in screen 204 and subsequently used in screen 206, a data flow edge is added from node 304 to node 306 in the graph 300.

Initially, at screen 204 of FIG. 2, a user may attempt to login. An entry node 302 may provide data from a customer database for the user based on the login as indicated by the arrow 328. The dashed arrow 303 indicates a control flow from a dummy state 302. If a user enters a query at screen 204 of FIG. 2 the control flow is indicated by dashed arrow 305. If the user selects to back to screen 204 of FIG. 2, a control flow edge is indicated by the dashed arrow 307. Upon entering a query, data indicating a search string associated with the query will flow from node 304 to node 306 as illustrated by arrow 320. The user may select a specific item from screen 206 of FIG. 2 and the event is indicated by the dashed arrow 309 while the event wherein a user selects to go back from screen 208 in FIG. 2 is indicated by the dashed arrow 311. When the user selects a specific item from screen 206 of FIG. 2, data indicating the specific item selected may flow from node 306 to node 308, as indicated by arrow 324.

A user may select a picture of a selected item at screen 208 of FIG. 2, as indicated by dashed arrow 313. The user may select to go back from screen 210 of FIG. 2 and return to screen 208 of FIG. 2 as indicated by the dashed line 315. If at screen 208 of FIG. 2 the user selects the picture of the selected item at screen 208 of FIG. 2, data indicating the specific item selected may flow from 306 to node 310 as indicated by arrow 326.

As discussed above, a user may select to leave feedback at screen 204 of FIG. 2, and this control flow is indicated by the dashed arrow 342. The user may select to go back from the screen 212 of FIG. 2, as indicated by the dashed arrow 344. To leave feedback, a reference to the customer database and ID for the customer is required at nodes 312, 314, 318, and 308. If a user logs in using a cID on screen 204 of FIG. 2, data indicating the cID may flow from node 304 to any other node, such as nodes 308, 312, 314, and 318 that may require the user identification as indicated by arrows 322. Further, if at screen 204 of FIG. 2 a user selects to leave feedback, data from the customer database indicating specific items for which the user has not left feedback may flow from the node 304 to the node 312 as indicated by the arrow 332.

An event may include a user selecting at screen 212 of FIG. 2 to leave feedback for recently purchased items, as indicated by the dashed arrow 346. The dashed arrow 348 indicates that an event including the user selecting to return to screen 212 from screen 214 of FIG. 2. Similar events are indicated by the arrows 350, 352, between nodes 314 and 308, and dashed arrows 354 and 356 between nodes 308 and 318.

If at screen 212 of FIG. 2 a user selects to leave feedback for recently purchased items, data from the customer database may flow from the node 312 to the node 314 as indicated by the arrow 334, and from node 312 to node 308 as indicated by the arrow 335. If at screen 214 of FIG. 2 the user selects a recently purchased item to leave feedback for, data indicating the selected item will flow from the node 314 to the node 308 and node 318, as indicated by the arrows 336, as well as data from the customer database from node 312 to node 318 as indicated by the arrow 338. Once feedback has been entered at screen 218 of FIG. 2, data indicating an update to the customer database will flow from node 318 to node 312 as indicated by the arrow 340, and from node 312 to node 304 as indicated by arrow 344.

The entry node 302 may be a server-side node enabling access to an item database and a customer database. The item data base may be needed at each of nodes 306, 308, 310, 318. The data flow of item database data from entry node 302 to each of the nodes 306, 308, 310, and 318 as indicated by the arrows 330.

As discussed above, the finite state machine graph 300 is a representation of a computing program. The representation illustrated in FIG. 3 may be used for analysis of the computing program.

Figure 4:
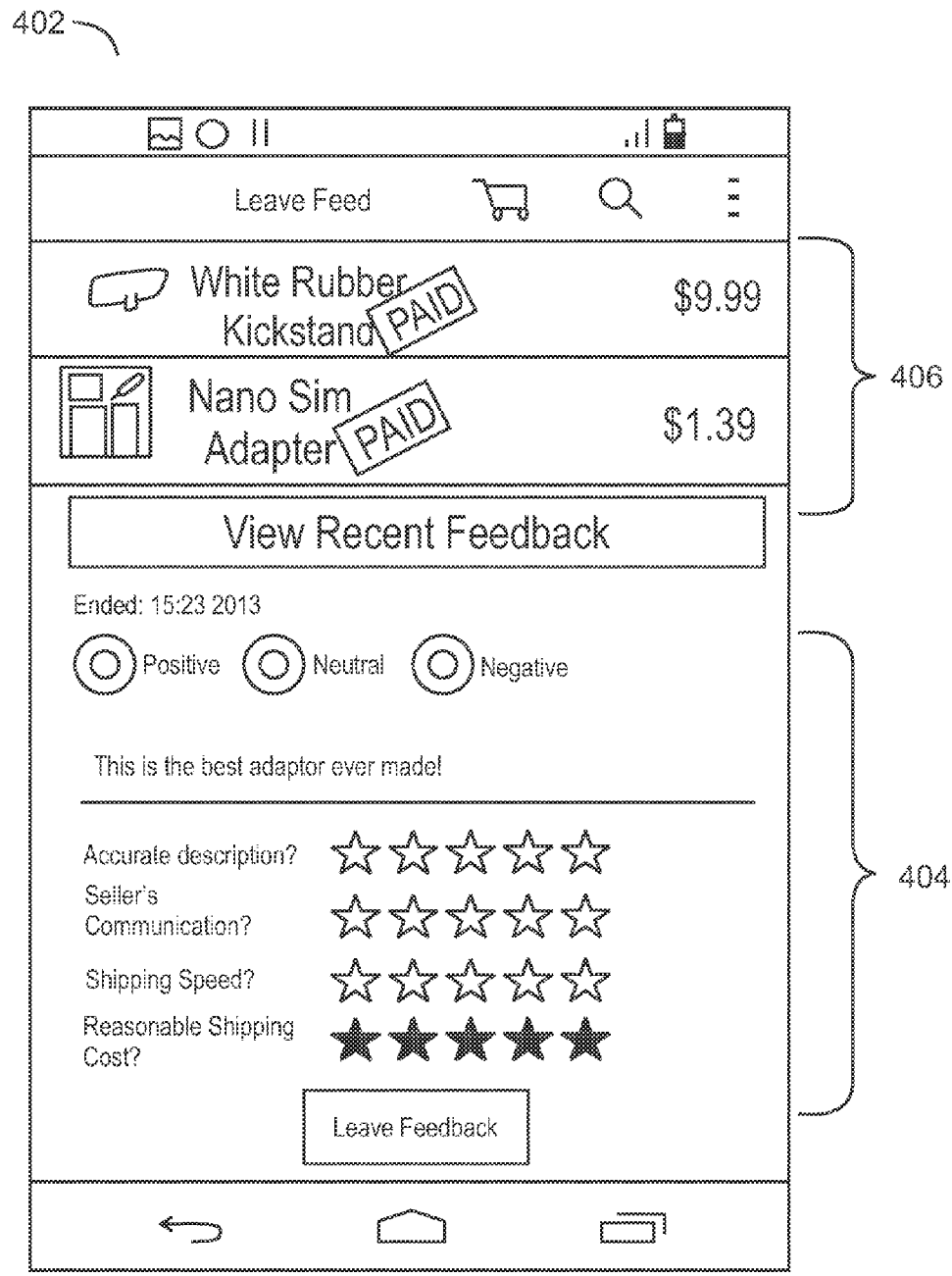
FIG. 4 is an example illustration of a merged screen of a mobile application.

FIG. 4 is an example illustration of a merged screen of a mobile application. The screen 402 illustrated in FIG. 4 is a merger of screens 214 and 218 of FIG. 2 discussed above. As illustrated, the screen 402 includes a functional element of the screen 218, such as the leave feedback element indicated by the bracket 404, and a functional element of screen 214, such as the listing of purchased items for which feedback has not yet been submitted as indicated by the bracket 406. The refactoring may require determining a starting point. In this case, the starting point may include two functional elements including the functional elements of screens 214 and 218. The starting point may be a functional element, or the entire screen or screens to be refactored. While not illustrated in FIG. 4, the refactoring may also include splitting a given screen by identifying a starting point including one or more functional elements to be split into two or more screens.

Figure 5:
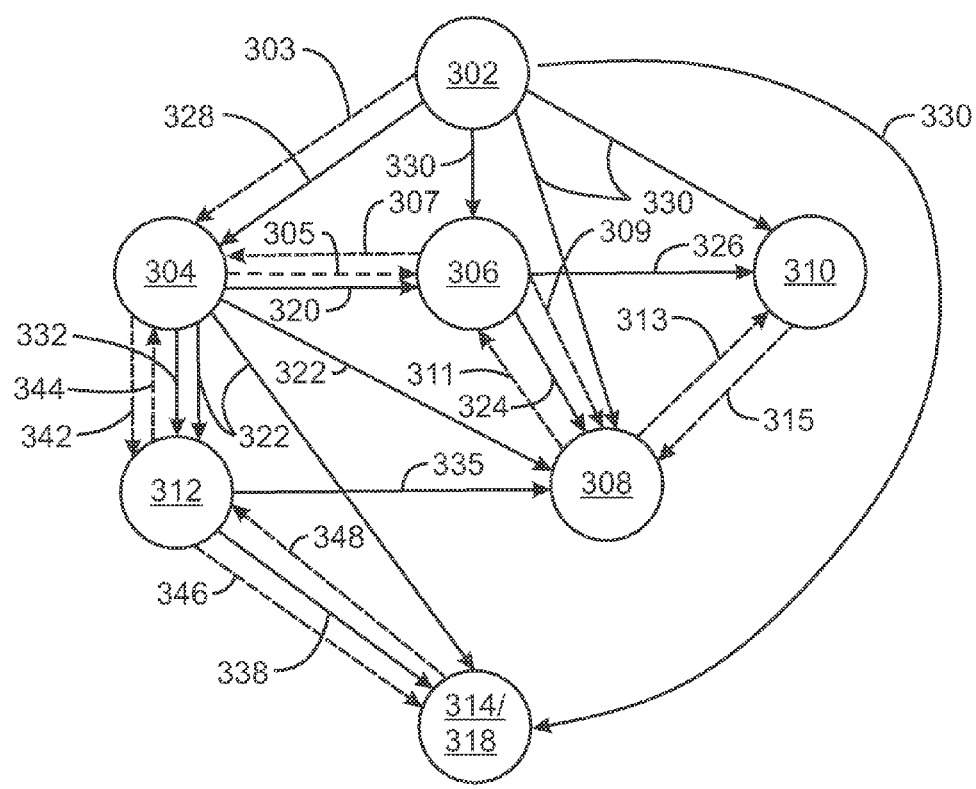
FIG. 5 is a graph illustrating the control flow and data flow between nodes after refactoring.

FIG. 5 is a graph illustrating the control flow and data flow between nodes after refactoring. As discussed above, the refactoring may be based on identified screens represented as nodes in a finite state machine. As illustrated in FIG. 5 in relation to FIG. 3, data flow to merged node 314/318 remains intact even while the control flow from node 308 to node 314/318 has been removed. The merged node 314/318 indicates the merged screen 402 of FIG. 4 discussed above. Other types of refactoring may be performed including splitting a given element or elements into two or more screens, splitting a given screen into two or more screens and the like. Further, while the finite statement machine graph of FIG. 5 is a convenient way to represent the refactored screens, other types of representations may be used, or the refactoring may be performed without the use of a representation at all.

Figure 6:
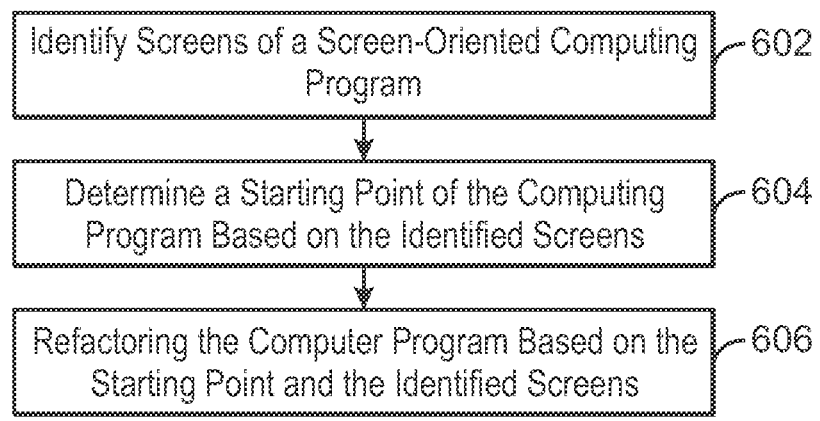
FIG. 6 is a block diagram illustrating a method of refactoring a computing program.

FIG. 6 is a block diagram illustrating a method of refactoring a computing program. The method 600 may include identifying screens of a computing program at block 602, and determining a starting point of the computing program based on the identified screens at block 604. At block 606, the computing program is refactored based on the starting point and the identified screens.

In embodiments, the identified screens are represented as nodes in the graph and data flow is represented as edges of the graph. As discussed above in reference to FIG. 3, events may be represented by dashed edges of the graph. The events may be result of user actions, incoming communications such as a wireless signal, a global positioning sensor signal, server-related data pushes, or any combination of user actions and incoming communications.

In embodiments, the identified screens comprise elements related to functional capacities of the computing program. The refactoring includes merging elements of the screens into a new merged screen, splitting elements of screens into a plurality of screens, or any combination thereof. The starting point may include one or more of the identified screens, one or more of the elements within an identified screen, or any combination thereof.

In embodiments, refactoring based on screens is applicable to screen-oriented applications. A screen-oriented application may include, for example, mobile applications, enterprise applications, or any combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++, HyperText Markup Language version 5, JavaScript, objective C, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
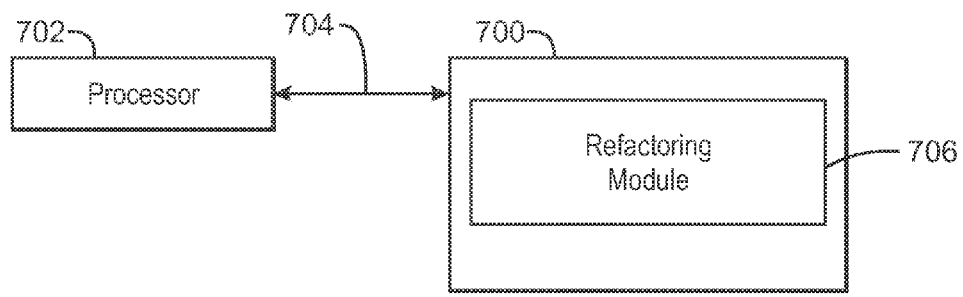
FIG. 7 is a block diagram depicting an example of a tangible, non-transitory computer-readable medium that can be used to refactor a computing program.

FIG. 7 is a block diagram depicting an example of a tangible, non-transitory computer-readable medium that can be used to refactor a computing program. The tangible, non-transitory, computer-readable medium 700 may be accessed by a processor 702 over a computer bus 704. Furthermore, the tangible, non-transitory, computer-readable medium 700 may include computer-executable instructions to direct the processor 702 to perform the steps of the current method.

The various software components discussed herein may be stored on the tangible, non-transitory, computer-readable medium 700, as indicated in FIG. 7. For example, a refactoring module 706 may be configured to identify screens of a computing program and determine a starting point of the computing program based on the identified screens. The refactoring module 706 may refactor the computing program based on the starting point and the identified screens.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, implemented with a processor and a storage device having instructions stored therein, where the instructions when executed by the processor cause the processor to execute the method steps, comprising:
   identifying screens of a screen-oriented computing program;
   determining a starting point of the computing program based on the identified screens,
   wherein the identified screens are correlated with states of a finite state machine graph, and wherein the identified screens are represented as nodes in the finite state machine graph and a data flow is represented as edges of the finite state machine graph, and
   wherein the finite state machine graph comprises an entry node enabling access to an item database and a customer database, wherein the entry node is a virtual initial state and does not represent the identified screens; and
   refactoring the computing program based on the starting point, the identified screens, and the finite state machine graph, wherein the data flow and a control flow of the refactored computing program remain the same as the data flow and the control flow of the computing program without refactoring.

2. The method of claim 1, wherein the identified screens comprise elements related to the functional capacity of the computing program.

3. The method of claim 2, wherein the refactoring comprises:
   merging elements of screens into a new merged screen;
   merging a plurality of screens into a new merged screen;
   splitting elements of screens into a plurality of screens;
   splitting a screen into a plurality of screens; or
   any combination of the above.

4. The method of claim 3, wherein the computing program is a mobile computing device application.

5. The method of claim 1, wherein the starting point comprises:
   one or more identified screens;
   one or more elements within an identified screen; or
   any combination of the above.

6. The method of claim 1, wherein the screens are displayed on a graphical user interface of a computing device.

7. The method of claim 1, wherein the computing program is to be implemented as:
   a mobile computing device application;
   as an enterprise application; or
   any combination of the above.

8. A computing device, comprising:
   a storage device;
   a processor;
   the storage device having instructions that when executed by the processor, cause the computing device to:
   identify screens of a screen-oriented computing program;
   determine a starting point of the computing program based on the identified screens, wherein the identified screens are correlated with states of a finite state machine graph, and wherein the identified screens are represented as nodes in the finite state machine graph and a data flow is represented as edges of the finite state machine graph, and wherein the finite state machine graph comprises an entry node enabling access to an item database and a customer database, wherein the entry node is a virtual initial state and does not represent the identified screens; and refactor the computing program based on the starting point, the identified screens, and the finite state machine graph, wherein the data flow and a control flow of the refactored computing program remain the same as the data flow and the control flow of the computing program without refactoring.

9. The computing device of claim 8, wherein the identified screens comprise elements related to the functional capacity of the computing program.

10. The computing device of claim 9, wherein the refactoring comprises:
merging elements of screens into a new merged screen;
merging a plurality of screens into a new merged screen;
splitting elements of screens into a plurality of screens;
splitting a screen into a plurality of screens; or
any combination of the above.

11. The computing device of claim 8, wherein the starting point comprises:
one or more identified screens;
one or more elements within an identified screen; or
any combination of the above.

12. The computing device of claim 8, wherein the screens are displayed on a graphical user interface of a computing device.

13. The computing device of claim 8, wherein the computing program is to be implemented as:
a mobile computing device application;
as an enterprise application; or
any combination of the above.

14. The computer program product of claim 13, wherein the starting point comprises:
one or more identified screens;
one or more elements within an identified screen; or
any combination of the above.

15. The computer program product of claim 13, wherein the screens are displayed on a graphical user interface of a computing device, and wherein the computing program is to be implemented as:
a mobile computing device application; an enterprise application; or
any combination of the above.

16. A computer program product for refactoring a computing program, the computer product comprising a computer readable storage medium having program code embodied therewith, the program code executable by a processor to perform a method comprising:
identifying, by the processor, screens of a screen-oriented computing program;
determining, by the processor, a starting point of the computing program based on the identified screens, wherein the identified screens are correlated with states of a finite state machine graph, and wherein the identified screens are represented as nodes in the finite state machine graph and a data flow is represented as edges of the finite state machine graph, and wherein the finite state machine graph comprises an entry node enabling access to an item database and a customer database, wherein the entry node is a virtual initial state and does not represent the identified screens; and
refactoring, by the processor, the computing program based on the starting point, the identified screens, and the finite state machine graph, wherein the data flow and a control flow of the refactored computing program remain the same as the data flow and the control flow of the computing program without refactoring.

17. The computer program product of claim 16, wherein the identified screens comprise elements related to the functional capacity of the computing program.

18. The computer program product of claim 17, wherein the refactoring comprises:
merging elements of screens into a new merged screen;
merging a plurality of screens into a new merged screen;
splitting elements of screens into a plurality of screens;
splitting a screen into a plurality of screens; or
any combination of the above.

* * * * *